United States Patent
Kawasaki

[11] Patent Number: 5,857,337
[45] Date of Patent: *Jan. 12, 1999

[54] TURBOCHARGER

[75] Inventor: Yukio Kawasaki, Anjo, Japan

[73] Assignee: Aisin Seiki Kabushiki Kaisha, Aichi-pref, Japan

[*] Notice: This patent issued on a continued prosecution application filed under 37 CFR 1.53(d), and is subject to the twenty year patent term provisions of 35 U.S.C. 154(a)(2).

[21] Appl. No.: 806,943

[22] Filed: Feb. 26, 1997

[30] Foreign Application Priority Data

Feb. 29, 1996 [JP] Japan .................. 8-042853

[51] Int. Cl.[6] .................................. F02B 37/18
[52] U.S. Cl. ........................................ 60/602
[58] Field of Search .................. 60/602; 417/407

[56] References Cited

U.S. PATENT DOCUMENTS 5,579,643 12/1996 McEwen et al. ................. 60/602
5,584,181 12/1996 Jinnouchi ........................ 60/602

FOREIGN PATENT DOCUMENTS 34765 9/1981 European Pat. Off. ............ 60/602
47-103817 4/1972 Japan .
54-19007 2/1979 Japan ................................ 60/602
7-139363 5/1995 Japan .

Primary Examiner—Michael Koczo
Attorney, Agent, or Firm—Hazel & Thomas, PC

[57] ABSTRACT

A turbocharger incorporates a turbine rotor, a housing having defined therein a turbine housing portion in which the turbine rotor rotated by exhaust gas is disposed, a shaft rotatably supported on the bearing housing portion via a bearing, a compressor rotor fixed to a second end of the shaft, a bypass passage formed on the turbine housing portion so as to communicatively connect an exhaust gas inlet and an exhaust gas outlet of the housing while bypassing the turbine rotor, a waste gate valve disposed in the bypass passage and operatively positioned to open or close the bypass passage in response to a boost pressure, and a nozzle member fixedly positioned with the exhaust gas outlet of the housing such that a first end of the nozzle member is adjacent to the turbine rotor while maintaining a predetermined clearance therefrom and a second end of the nozzle member defines an opening of an exhaust gas outlet side of the bypass passage oriented along the direction of the main flow of the exhaust gas discharged from the turbine rotor. The housing further has defined therein the exhaust gas inlet, the exhaust gas outlet and a bearing housing portion which is formed on the turbine housing portion. The turbine rotor is fixed to a first end of the shaft. The compressor rotor is disposed in a compressor housing fixed to the bearing housing portion.

3 Claims, 5 Drawing Sheets

TURBOCHARGER

BACKGROUND OF THE INVENTION

1. Field of the Invention

The present invention relates to a turbocharger and, more particularly, to a turbocharger including a waste gate structure for controlling a boost pressure.

2. Description of the Prior Art

A conventional turbocharger is disclosed in, for example, Japanese patent application laid-open publication No. 4(1992)-103817. This turbocharger includes a turbine rotor, a turbine housing in which the turbine rotor rotated by exhaust gas is disposed therein and which is provided with an exhaust gas inlet and an exhaust gas outlet, a bearing housing which is fixed to the turbine housing, a shaft which is rotatably supported on the bearing housing via a radial bearing and on one end of which the turbine rotor is fixed thereon, a compressor rotor which is fixed on the other end of the shaft and which is disposed in a compressor housing fixed to the bearing housing, a bypass passage which is formed on the turbine housing so as to communicate between the exhaust gas inlet and the exhaust gas outlet while bypassing the turbine rotor and a waste gate valve which is disposed in the bypass passage and which opens or closes the bypass passage in response to a boost pressure (a pressure of intake air supercharged by the compressor rotor). In this turbocharger, when the boost pressure exceeds a predetermined value, the waste gate valve is opened by a driving mechanism and the exhaust gas inlet communicates with the exhaust gas outlet. Thereby, a part of the exhaust gas is discharged to the exhaust gas outlet while bypassing the turbine rotor and the boost pressure is maintained at a constant value.

The turbine rotor has to be disposed while maintaining a predetermined slight clearance between adjacent members and its circumference in order to efficiently rotate by the exhaust gas. Therefore, in the above mentioned prior turbocharger, the turbine housing and the bearing housing are constituted as a two-piece construction in order to prevent the assembling of the turbocharger from deteriorating due to the shape of the turbine rotor. Thereby, a coupling or a plate and so on are required for air-tight fastening between the turbine housing and the bearing housing. As a result, the manufacturing cost of the turbocharger is increased due to the increase in the number of the parts, and there is the danger of the exhaust gas leaking from the fastening portion between the turbine housing and the bearing housing.

Furthermore, in the above mentioned prior turbocharger, the bypass flow of the exhaust gas which is discharged toward the exhaust gas outlet via the bypass passage interferes with the main flow of the exhaust gas discharged from the turbine rotor and the exhaust pressure. Namely, the exhaust gas pressure of the outlet side of the turbine rotor is increased. As a result, the exhaust gas pressure of the inlet side of the turbine rotor is increased and thereby the efficiency of the turbocharger is decreased.

SUMMARY OF THE INVENTION

It is, therefore, an object of the present invention to provide an improved turbocharger which overcomes the above drawbacks.

It is another object of the present invention to provide an improved turbocharger which can prevent the exhaust gas from leaking and which can prevent the exhaust gas pressure of the outlet side of the turbine rotor from increasing.

In order to achieve these objectives, there is provided an improved turbocharger which includes a turbine rotor, a housing having a turbine housing portion in which the turbine rotor rotated by exhaust gas is disposed therein and which is provided with an exhaust gas inlet and an exhaust gas outlet and a bearing housing portion which is formed on the turbine housing portion in a body, a shaft which is rotatably supported on the bearing housing portion via a bearing and on one end of which the turbine rotor is fixed thereon, a compressor rotor which is fixed on the other end of the shaft and which is disposed in a compressor housing fixed to the bearing housing portion, a bypass passage to which is formed on the turbine housing portion so as to communicate between the exhaust gas inlet and the exhaust gas outlet while bypassing the turbine rotor, a waste gate valve which is disposed in the bypass passage and which opens or closes the bypass passage in response to a boost pressure and a nozzle member which is fixed to the turbine housing portion so as to be adjacent with the turbine rotor while maintaining a predetermined clearance at its one end and so as to form an opening of the exhaust gas outlet side of the bypass passage orienting along the direction of the main flow of the exhaust gas discharged from the turbine rotor at its the other end.

BRIEF DESCRIPTION OF THE DRAWINGS

Additional objects and advantages of the present invention will become more apparent from the following detailed description of preferred embodiments thereof when considered with reference to the attached drawings, in which.

DESCRIPTION OF THE PREFERRED EMBODIMENTS

A turbocharger in accordance with preferred embodiments of the present invention will be described with reference to the attached drawings.

Figure 1:
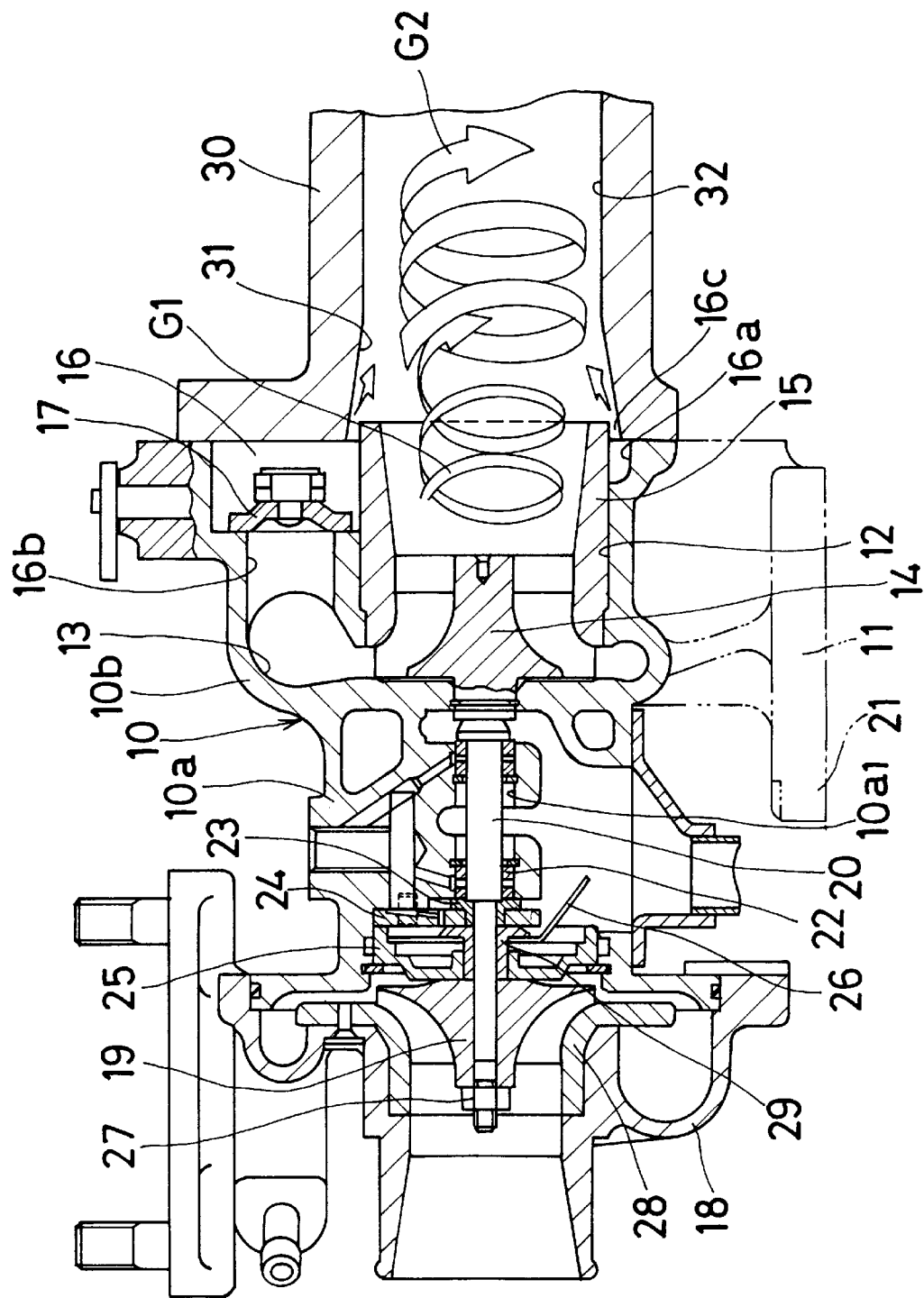
FIG. 1 shows a sectional view of an first embodiment of a turbocharger in accordance with the present invention.
Figure 2:
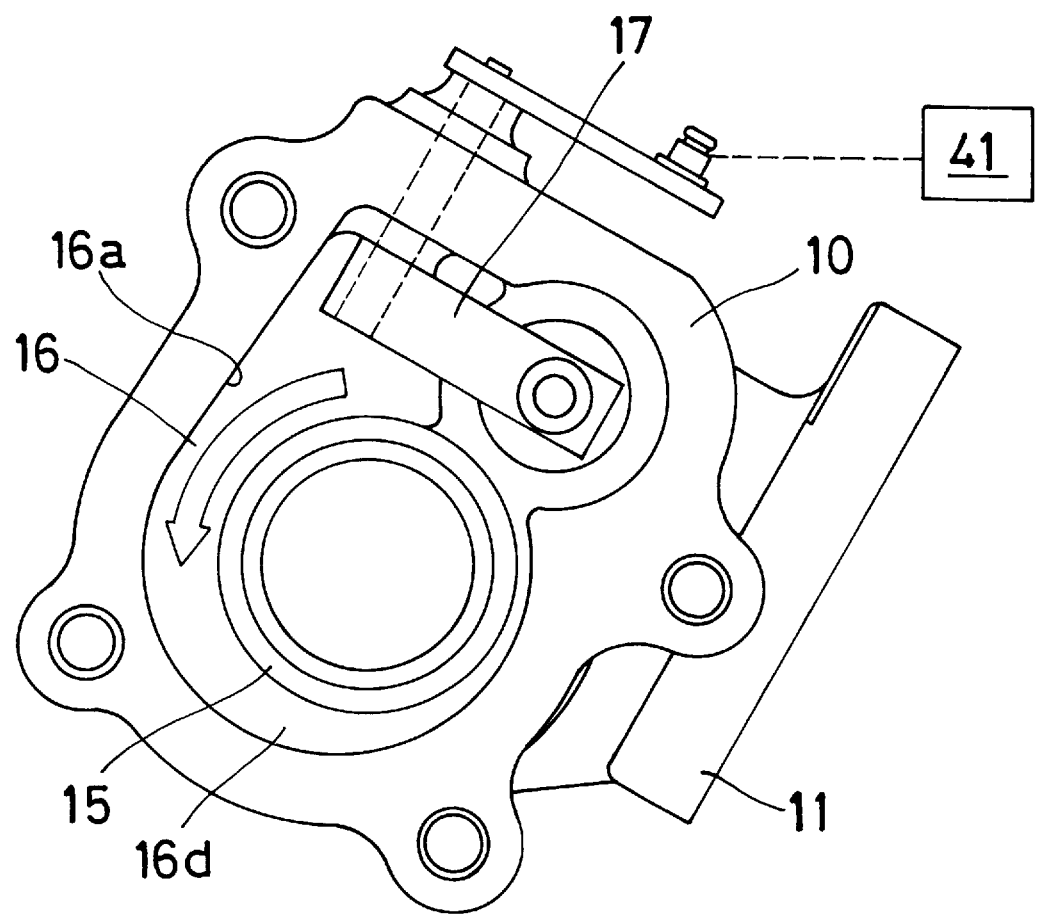
FIG. 2 shows a side view of a housing of FIG. 1.

FIGS. 1 and 2 show a first embodiment of the present invention. Referring to FIG. 1, a housing 10 which is made of cast iron is provided with a cylindrical bearing housing portion 10a integrally formed with a turbine rotor housing 10b. A pair of axial holes 10a1 are formed in the bearing housing portion 10a and a center portion of a shaft 20 is rotatably supported in the axial holes 10a1 via radial bearings 21 and 22, respectively. The radial bearings 21 and 22 are rotatably fitted into the axial holes 10a1 and snap rings, which are fixed in the axial holes 10a1, prevent the radial bearings 21 and 22 from moving in an opposite direction from each other. A large diameter portion is formed on the right side of shaft 20 as viewed in FIG. 1, so as to be adjacent to the radial bearing 21 for preventing the radial bearing 21 from moving toward the right-hand side. A small diameter portion is formed on the left-hand side of the shaft 20. A cylindrical bushing 23, having a flange portion at the right-hand end portion is fitted on the small diameter portion of the shaft 20 so that the flange portion can be contacted with an end surface of the left-hand side of the radial bearing 22. On the small diameter portion of the shaft 20, a cylindrical bushing 29, having a flange portion, is fitted thereon so as to contact the flange portion with the left-hand end portion of the bushing 23. A circular groove is formed on an outer circumferential portion of a cylindrical portion of the bushing 29 and an oil seal is fitted in the circular groove. A large diameter hole is formed on the left-hand side of the axial holes 10a1 of the bearing housing portion 10a. A plate seal 25, having an inner hole into which the bushing 29 is fluid-tightly fitted via the oil seal, is fitted into the large diameter hole.

A compressor rotor 19, having a plurality of radial blades is fitted on the small diameter portion of the shaft 20 which is located at the left-hand side with respect to the bushing 29. A nut 27 is tightened on the end portion of the small diameter portion of the shaft 20 so as to press the compressor rotor 19 toward the bushing 29. Thereby, the bushing 23 and the bushing 29 are nipped between the right-hand side surface of the compressor rotor 19 and a stepped portion between the small diameter portion and the center portion of the shaft 20 and whereby they can then be rotated with the shaft 20 and the compressor rotor 19 as a single body. A thrust bearing 24, which is fixed in the large diameter hole of the bearing housing portion 10a, is inserted between the flange portion of the bushing 23 and the flange portion of the bushing 29 which are opposite each other. The bearing housing portion 10a is provided with oil passages for supplying oil to the radial bearings 21 and 22. The thrust plate 24 is provided with an oil supply hole which is in communication with the oil passages of the bearing housing portion 10a in order to supply oil to the friction portion between the thrust bearing 24 and the flange portions of the bushings 23 and 29. The plate seal 25 is prevented from moving in the axial direction by the thrust bearing 24, and a snap ring is fitted into the opening of the large diameter hole of the bearing housing portion 10a. A compressor housing 18, in which the compressor rotor 19 is disposed, is air-tightly fixed to the bearing housing portion 10a, and has an air inlet and an air outlet. The air inlet is in communication with an air inlet duct (not shown) and an air inlet of the compressor rotor 19 constituted by inner openings of the passages each of which is formed between the adjacent blades. The air outlet is in communication with an intake manifold of an engine (not shown) and an outlet of the compressor rotor 19 constituted by outer openings of the passages each of which is formed between the adjacent blades. In FIG. 1, the numeral 26 is an oil deflector.

A turbine rotor 14, having a plurality of radial blades, is disposed in the turbine housing portion 10b and is fixed at the right-hand side end of the shaft 20. The turbine housing portion 10b has an exhaust gas inlet 11 and an exhaust gas outlet 12. The exhaust gas inlet 11 is air-tightly connected to an exhaust manifold of the engine (not shown) and is in communication with an inlet of the turbine rotor 14 constituted by outer openings of the passages each of which is formed between the adjacent blades. The exhaust gas outlet 12 is air-tightly connected to an exhaust gas outlet pipe 30, and is in communication with an outlet of the turbine rotor 14 constituted by inner openings of the passages each of which is formed between the adjacent blades. The inlet of the turbine rotor 14 is in communication with the exhaust gas inlet via an outer passage 13 which is formed on the turbine housing portion 10b. A cylindrical nozzle member 15 is fixed pressed into the exhaust gas outlet 12. One end of the nozzle member 15 has a shape corresponding to outer circumferential portions of the blades of the turbine rotor 14, and is opposite to the outer circumferential portions of the blades of the turbine rotor 14 while maintaining a predetermined slight clearance.

As shown in FIGS. 1 and 2, a bypass passage 16, which can communicate between the exhaust gas inlet 11 and the exhaust gas outlet 12 while bypassing the turbine rotor 14, is formed between the turbine housing portion 10b and the exhaust gas outlet pipe 30. One end 16b of the bypass passage 16 is opened into the outer passage 13. A groove 16a is formed on an opposite end surface of the turbine housing portion 10b to the exhaust gas outlet pipe 30. The groove 16a includes a scroll groove portion which is formed around the outer circumferential surface of the nozzle member 15 and has a sectional area which is decreased along the rotational direction of the turbine rotor 14. Thereby, as mentioned above, when the exhaust gas outlet pipe 30 is fixed to the turbine housing portion 10b, the bypass passage 16 is formed therebetween and furthermore a scroll chamber 16d is formed as a part of the bypass passage 16.

As shown in FIG. 1, the exhaust gas outlet pipe 30 is provided with an inner bore 32 which has a cone-shaped portion 31 at one end thereof. The cone-shaped portion 31 makes the diameter of the inner bore 32 gradually increase toward the turbine housing portion 10b. The other end of the nozzle member 15 projects into the cone-shaped portion 31 of the exhaust gas outlet pipe 30 so as to form a contracted circular opening 16c that functions as an ejecting nozzle between the other end of the nozzle member 15 and the inner-surface of the cone-shaped portion 31. The circular opening 16c communicates with the scroll chamber 16d as the other end of the bypass passage 16.

A waste gate valve 17 is disposed in the bypass passage 16, as shown in FIG. 2. The waste gate valve 17 opens and closes the one end 16b of the bypass passage 16 by means of a control device 41, so that the bypass flow of the exhaust gas flowing into a bypass passage 16 is controlled thereby controlling the boost pressure. When the waste gate valve 17 opens the bypass passage 16, part of the exhaust gas supplied to the exhaust gas inlet 11 flows into the bypass passage 16. Since the sectional area or the volume of the scroll chamber 16d gradually decreases as the distance from the one end 16b of the bypass passage 16 increases, the velocity of the bypass flow of the exhaust gas efficiently increases by means of the scroll chamber 16d. Consequently, the exhaust gas uniformly flows into the exhaust gas outlet pipe 30 along the inner circumferential surface of the inner bore 32 from the whole circumference of the circular opening 16c so as to swirl into the exhaust gas outlet pipe 30. The direction of this swirl is the same as the rotational direction of the turbine rotor 14.

The above-described first embodiment operates as follows:

When the engine (not shown) is started, the turbocharger begins to supercharge the engine. Namely, the exhaust gas flows into the exhaust gas inlet 11 making the turbine rotor 14 rotate. The compressor rotor 19 then rotates through the shaft 20 so that air is supercharged. The exhaust gas which drove the turbine rotor 14 becomes a spiral flow G1 as shown in FIG. 1, and is discharged from the inner bore of the nozzle member 15 into the exhaust gas outlet pipe 30 so as to swirl. In this condition, the waste gate valve 17 closes the bypass passage 16. As a result, the rotational direction of this spiral flow G1 is the same as that of the turbine rotor 14.

When the rotational speed of the engine and the turbine rotor 14 increases, whereby the boost pressure of the engine exceeds a predetermined value, the waste gate valve 17 is driven and opens the bypass passage 16. A part of the exhaust gas supplied to the exhaust gas inlet 11 then flows into the exhaust gas outlet pipe 30 from the circular opening 16c through the bypass passage 16, while bypassing the turbine rotor 14. As a result, the boost pressure is maintained at the predetermined value.

By the actions of the scroll chamber 16d and the circular groove 16c, the exhaust gas discharged into the bypass passage 16 is compressed, and the velocity of its flow increases. Then, the exhaust gas is discharged from the circular opening 16c into the exhaust gas outlet pipe 30 so as to swirl along the inner circumferential surface of the inner bore of the exhaust gas outlet pipe 30. In this condition, since the velocity of the exhaust gas discharged from the turbine rotor 14 is lower than that of the exhaust gas discharged from the circular opening 16c, the exhaust gas discharged from the turbine rotor 14 is sucked out by an ejection effect due to the difference of the flow velocity. Furthermore, since the sectional area of the scroll groove portion of the groove 16a decreases along the rotational direction of the turbine rotor 14, the exhaust gas discharged from the circular opening 16c becomes a spiral flow G2 as shown in FIG. 1, whose rotational direction is the same as that of the spiral flow G1 of the exhaust gas discharged from the turbine rotor 14. Consequently, the spiral flows G1 and G2 do not interfere with each other and the above mentioned suctioning of the exhaust gas discharged from the turbine rotor 14 is more efficiently done.

As mentioned above, according to the first embodiment, the flow of the exhaust gas in the exhaust gas outlet pipe 30 becomes smooth, and thereby the pressure of the exhaust gas in the nozzle member 15 (i.e., the exhaust gas outlet 12) and the exhaust gas outlet pipe 30 decreases. Accordingly, the pressure of the exhaust gas in the exhaust gas inlet 11 decreases, thereby improving the efficiency of the turbocharger. Furthermore, since the bearing housing portion 10a and the turbine housing portion 10b are integrated into a one-piece construction as the housing 10, the coupling between the turbine housing and the bearing housing and additional members for coupling such as the conventional turbocharger are not required. Thereby, it is possible to reduce the number of the component parts of the turbocharger and the exhaust gas is prevented from leaking through the coupling portion. Furthermore, since the turbine housing portion 10b and the nozzle member 15 are constituted as a two-piece construction, even though the bearing housing portion 10a and the turbine housing portion 10b are integrated into a one-piece construction, the assembling of the turbine rotor 14 is not deteriorated. Namely, in FIG. 1, the turbine rotor 14 together with the shaft 20 is assembled to the housing 10 from the right-hand side before the nozzle member 15 is fixed to the turbine housing portion 10b. Furthermore, since there is large amount of room for choosing the material of the nozzle member 15, it is possible to use for the nozzle member 15 a material having the equal thermal expansion rate as the turbine rotor 14 made of Inconel or ceramic and so on. Thereby, it is possible to properly maintain the predetermined slight clearance between the turbine rotor 14 and the nozzle member 15 and therefore the efficiency of the turbocharger is improved.

Figure 3:
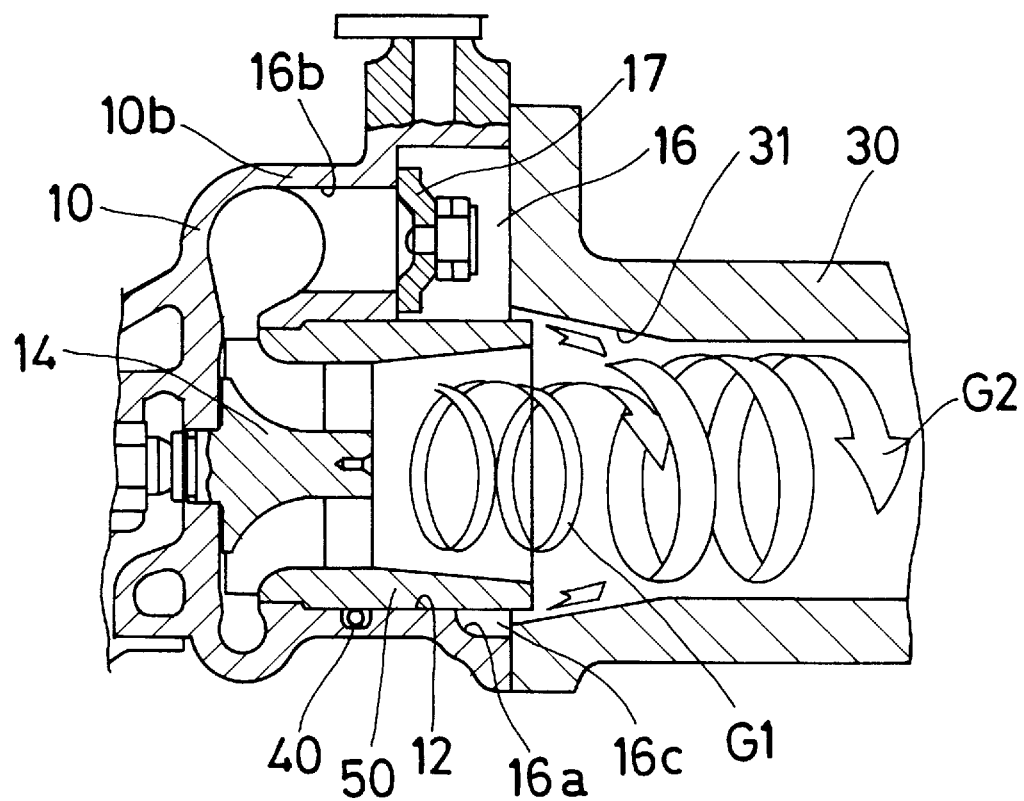
FIG. 3 shows a partial sectional view of a modification of an first embodiment of a turbocharger in accordance with the present invention.

FIG. 3 shows a modification of the first embodiment. In FIG. 3, the same parts as compared with FIG. 1 are identified by the same reference numerals. In this modification, the nozzle member 50 is fitted into the exhaust gas outlet 12 and is fixed to the turbine housing portion 10b by a pin member 40 which is fixedly pressed into a hole formed on the turbine housing portion 10b so that a part of the hole is opened into the exhaust gas outlet 12. In this modification, it is possible to obtain the same effects as the above first embodiment. Since the other structures are the same as the first embodiment, the description thereof is omitted.

Figure 4:
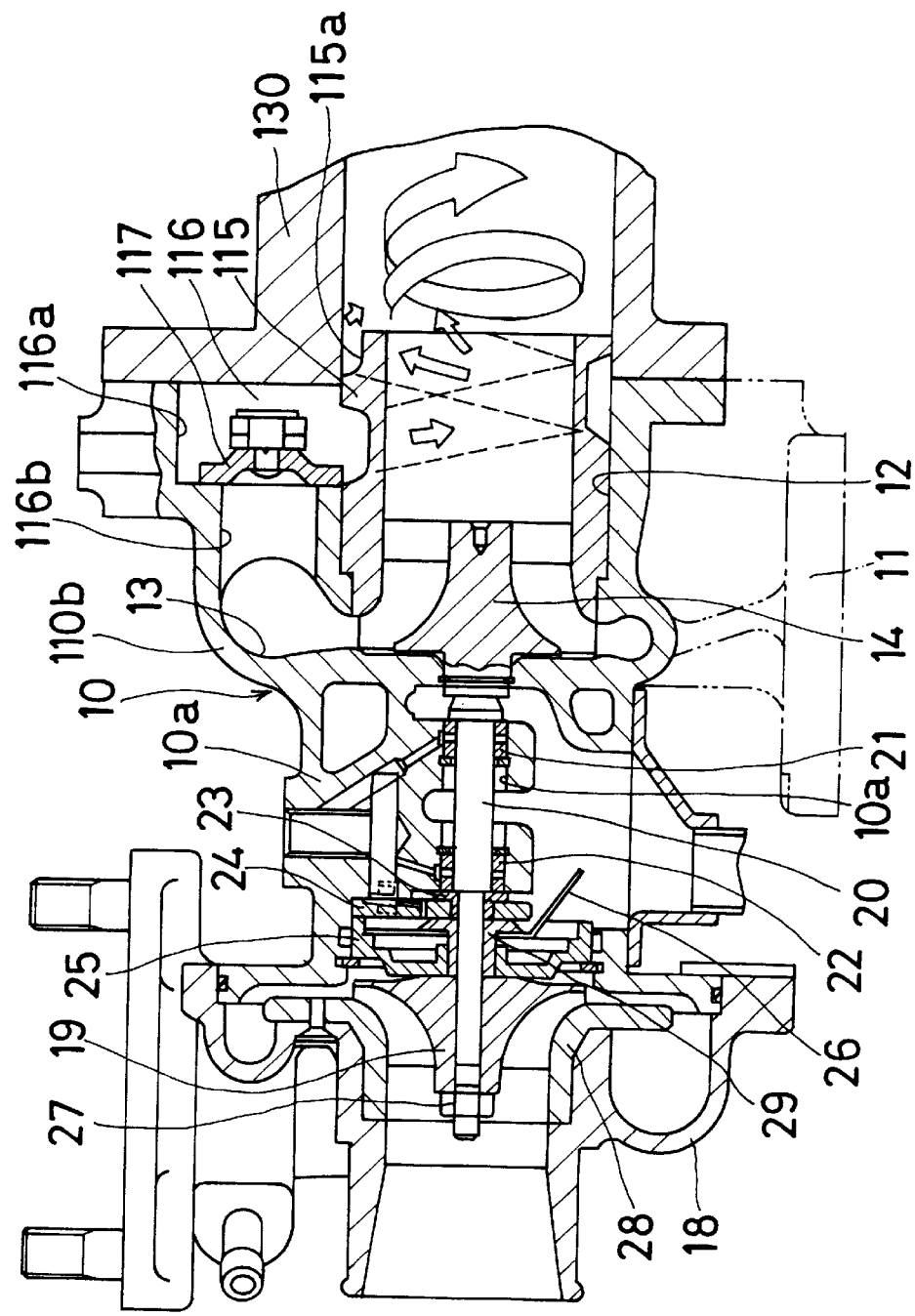
FIG. 4 shows a sectional view of an second embodiment of a turbocharger in accordance with the present invention.
Figure 5:
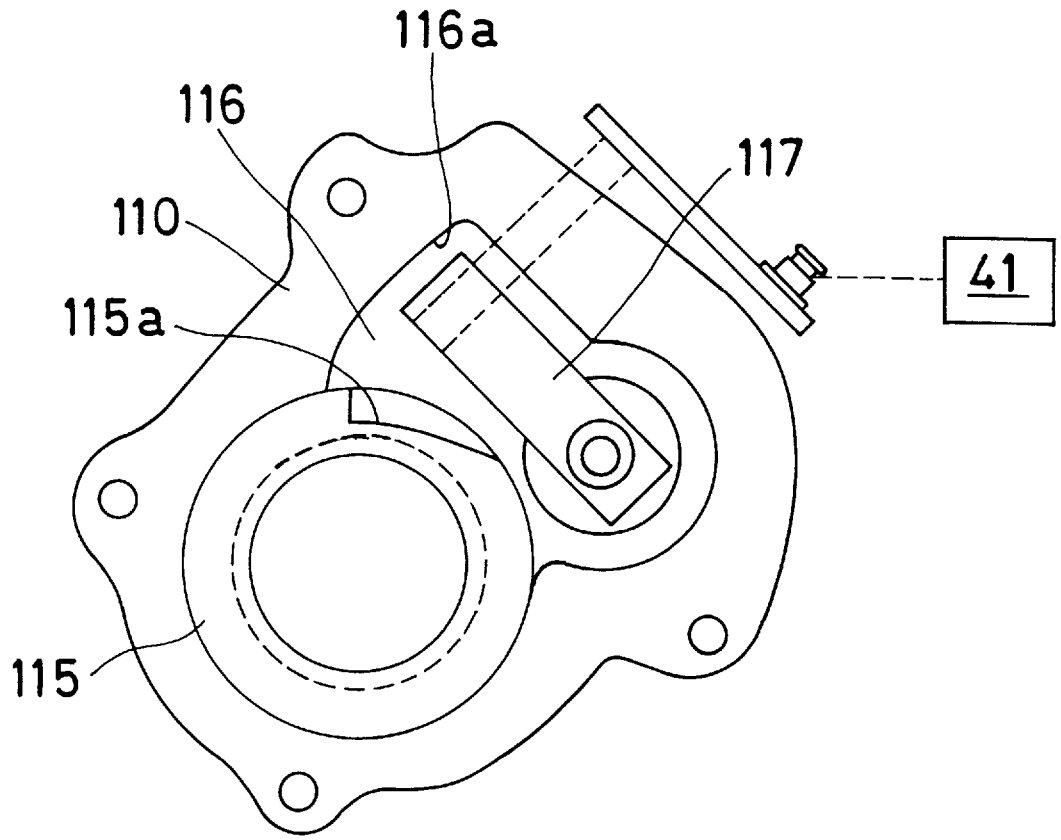
FIG. 5 shows a side view of a housing of FIG. 4.
Figure 6:
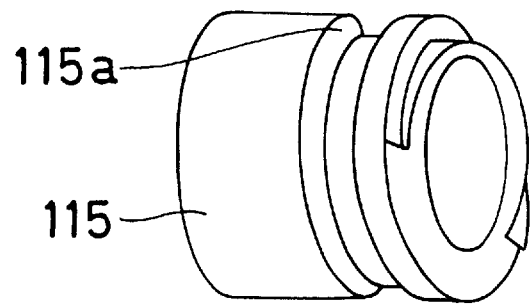
FIG. 6 shows a perspective view of a nozzle member of FIG. 5.

FIGS. 4 to 6 show a second embodiment of the present invention. In FIG. 4, the same parts as compared with FIG. 1 are identified by the same reference numerals. In this second embodiment, a groove 16a having the scroll portion of the first embodiment is formed on the opposite end surface of a turbine housing portion 110b connecting to the exhaust gas outlet pipe 130, which is fixed to the turbine housing portion 110b. Further, a concave portion 116a in which a waste gate valve 117 is disposed therein and which constitutes a part of a bypass passage 116, is formed on this opposite end surface of the turbine housing portion 110b. One end opening 116b of the bypass passage communicates with an outer passage 113 which is communicatively connected between an exhaust gas inlet 11 and a turbine rotor 14.

A cylindrical nozzle member 115 is fixedly pressed into an exhaust gas outlet 12 of the turbine housing portion 110b, and defines a part of an inner circumference of the concave portion 116a, as shown in FIG. 5. One end of the nozzle member 115 has a shape corresponding to outer circumferential portions of the blades of the turbine rotor 14, and is opposite to the outer circumferential portions of the blades of the turbine rotor 14 while maintaining a predetermined slight clearance. The other end of the nozzle member 115 projects into an inner bore of the exhaust gas outlet pipe 130.

As shown in FIG. 6, a spiral groove 115a, which is extended toward the exhaust gas outlet pipe 130 along the rotational direction of the turbine rotor 14, is formed on an outer circumferential surface of the nozzle member 115 and forms a part of the bypass passage 116 by the inner circumferential surfaces of the exhaust gas outlet 12 and the exhaust gas outlet pipe 130. One end of the spiral groove 115a is opened into the concave portion 116a, and the other end of is the spiral groove 115a is opened into the exhaust gas outlet pipe 130 along the inner circumferential surface of the inner bore of the exhaust gas outlet pipe 130. Thereby, when the exhaust gas outlet pipe 130 is fixed to the turbine housing portion 110b, the bypass passage 116 is formed by the one end opening 116b, the concave portion 116a and the spiral groove 115a of the nozzle member 115 so that the flow of the exhaust gas discharged into the bypass passage 116 is throttled by the spiral groove 115a. Now, it is possible to form the spiral groove 115a so that the sectional area decreases along the rotational direction of the turbine rotor 14 successively.

According to this second embodiment, when the waste gate valve 117 is opened, a part of the exhaust gas supplied to the exhaust gas inlet 11 flows into the exhaust gas outlet pipe 130 through the bypass passage 116. By the action of the spiral groove 115a, the exhaust gas discharged into the bypass passage 116 is compressed, and the velocity of its flow increases. Then, the exhaust gas is discharged from the other end of the spiral groove 115a into the exhaust gas outlet pipe 130 so as to swirl along the inner circumferential surface of the inner bore of the exhaust gas outlet pipe 130. In this condition, since the velocity of the exhaust gas discharged from the turbine rotor 14 is lower than that of the exhaust gas discharged from the other end of the spiral groove 115a, the exhaust gas discharged from the turbine rotor 14 is sucked out by an ejection effect due to the difference in the flow velocity. Furthermore, since the spiral groove 115a extends toward the exhaust gas outlet pipe 130 along the rotational direction of the turbine rotor 14, the exhaust gas discharged from the other end of the spiral groove 115a becomes a spiral flow whose rotational direction is the same as that of the spiral flow of the exhaust gas discharged from the turbine rotor 14. Consequently, both of the spiral flows do not interfere with each other and the above mentioned suctioning of the exhaust gas discharged from the turbine rotor 14 is more efficiently done. Since the other structures and the operation thereof are the same as the first embodiment, the description is omitted.

In conventional turbochargers, the diameter of the turbine rotor was designed to decrease in order to improve the efficiency of the turbocharger at low rotational speeds of the engine. At high rotational speeds, however, the pressure of the exhaust gas discharged from the engine increases, thereby causing a decrease in the performance of the turbocharger. Consequently, there was a limit to the amount that the diameter of the turbine rotor could be reduced. Therefore, further improvements in the performance of the turbocharger could not be expected with that design technique.

According to the present invention, since the bypass flow of the exhaust gas discharged from the bypass passage does not interfere with the main flow of the exhaust gas discharged from the turbine rotor, the pressure of the exhaust gas at the outlet of the turbine rotor is prevented from increasing. As a result, it then becomes possible to decrease the diameter of the turbine rotor in order to improve the performance of the turbocharger at low rotational speeds of the engine without lowering the performance of the turbocharger, thereby improving the performance of the turbocharger over the entire spectrum of rotational speeds of the engine.

Furthermore, according to the present invention, since the turbine housing and the bearing housing are constituted as a one-piece construction and the turbine housing and the nozzle member are constituted as a two-piece construction, it is possible to prevent the exhaust gas from leaking through the fastening portion between the turbine housing and the bearing housing without deteriorating the assembling of the turbocharger.

The principles, preferred embodiments and modes of operation of the present invention have been described in the foregoing description. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A turbocharger comprising:

a turbine rotor;

a housing having defined therein a turbine housing portion in which the turbine rotor rotated by exhaust gas is disposed, the housing further having defined therein an exhaust gas inlet, an exhaust gas outlet and a bearing housing portion which is integrally formed on the turbine housing portion;

a shaft rotatably supported on the bearing housing portion via a bearing, the turbine rotor being fixed to a first end of the shaft;

a compressor rotor fixed to a second end of the shaft, the compressor rotor being disposed in a compressor housing fixed to the bearing housing portion;

a bypass passage formed on the turbine housing portion so as to communicatively connect the exhaust gas inlet and the exhaust gas outlet while bypassing the turbine rotor;

a waste gate valve disposed in the bypass passage and operatively positioned to open or close the bypass passage in response to a boost pressure; and a nozzle member, which is detachable from the housing, fixedly positioned with the exhaust gas outlet of the housing such that a first end of the nozzle member is adjacent to the turbine rotor while maintaining a predetermined clearance therefrom and a second end of the nozzle member defines an opening of an exhaust gas outlet side of the bypass passage oriented along a direction of the main flow of the exhaust gas discharged from the turbine rotor, wherein the shaft is formed with a diameter that increases from the second end to the first end, and the first end of the nozzle member is further formed with a shape corresponding to and opposingly positioned with outer circumferential portions of the turbine rotor so as to maintain the predetermined clearance therewith.

2. A turbocharger as claimed in claim 1, wherein the bypass passage has a scroll chamber portion which is formed around an outer circumferential surface of the nozzle member and defined with a sectional area that progressively decreases along a rotational direction of the turbine rotor and an exhaust gas outlet side of the bypass passage is circularly formed around an outer circumferential surface of the nozzle member.

3. A turbocharger as claimed in claim 1, wherein a part of the bypass passage is constituted by a spiral groove which is formed on the outer circumferential surface of the nozzle member, which is extended in the rotational direction of the turbine rotor and whose exhaust gas outlet side is opened so as to be along the direction of the main flow of the exhaust gas discharged from the turbine rotor.

* * * * *